United States Patent
Braun et al.

(10) Patent No.: US 7,115,068 B2
(45) Date of Patent: Oct. 3, 2006

(54) SYSTEM HAVING A UNIT FOR ACTUATING A STOP/START UNIT

(75) Inventors: Harald Braun, Esslingen (DE); Henry Gmelin, Stuttgart (DE); Torsten Scholt, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 84 days.

(21) Appl. No.: 10/897,442

(22) Filed: Jul. 23, 2004

(65) Prior Publication Data

US 2005/0051125 A1 Mar. 10, 2005

(30) Foreign Application Priority Data

Jul. 24, 2003 (DE) ................ 103 33 603

(51) Int. Cl.
*F16H 59/74* (2006.01)

(52) U.S. Cl. ....................................... 477/99

(58) Field of Classification Search ............... 477/99; 123/179.4; 307/10.6
See application file for complete search history.

(56) References Cited

U.S. PATENT DOCUMENTS

| | | | |
|---|---|---|---|
| 6,434,475 B1 * | 8/2002 | Kaneko et al. | 701/112 |
| 6,482,127 B1 * | 11/2002 | Katou | 477/192 |
| 6,702,718 B1 * | 3/2004 | Tani et al. | 477/203 |

FOREIGN PATENT DOCUMENTS

DE 101 61 343 A1 12/2001

* cited by examiner

*Primary Examiner*—Dirk Wright
(74) *Attorney, Agent, or Firm*—Crowell & Moring LLP

(57) ABSTRACT

A regulating or control unit actuates a stop/start unit for an internal-combustion engine in a motor vehicle. At least one sensor is provided for detecting at least one parameter which is dependent on a steering wheel position of the motor vehicle. The regulating or control unit actuates the stop/start unit as a function of the detected parameter information.

12 Claims, 3 Drawing Sheets

SYSTEM HAVING A UNIT FOR ACTUATING A STOP/START UNIT

BACKGROUND AND SUMMARY OF THE INVENTION

This application claims the priority of German patent document 103 33 603.6, filed Jul. 24, 2003, the disclosure of which is expressly incorporated by reference herein.

The invention relates to a system having a device for actuating a stop/start unit for operating a combustion engine.

Automatic stop/start units are used particularly in motor vehicles in order to save power when switching off an internal-combustion engine during traffic light phases or in congested traffic. However, if switch-off phases are too short, the saving of power is overcompensated by an expenditure of power during the start of the internal-combustion engine. It is therefore particularly important to recognize a driving situation, and to adapt the operation of the automatic stop/start unit to the driving situation.

German Patent Document DE 101 61 343 A1 discloses a system which has a control unit for actuating an automatic stop/start unit for an internal-combustion engine with a transmission. The automatic stop/start unit comprises a starter for starting the internal-combustion engine and an interruption unit for interrupting a fuel supply. Several sensors are provided for detecting parameters as a function of which the stop/start unit is actuated during the operation.

The internal-combustion engine is stopped automatically when an automatic stopping condition has been met while the internal-combustion engine is running, and is started automatically when an automatic starting condition has been met. The stop condition has been met when all of the following individual conditions have been satisfied: (1) The vehicle speed is lower than a desired value, which differs from zero; (2) an idling switch is switched on; and (3) a drive position of the transmission corresponds to a neutral position.

The automatic start condition has been met when one of the following individual conditions has been met: (1) The clutch is changed into a disengaged condition, starting from a completely engaged or semi-engaged condition; (2) the drive position of the transmission is not the neutral position; (3) an idling switch is switched off; or (4) the condition of a booster vacuum is present.

One object of the invention is to provide an improved automatic stop/start unit, with improved adaptation to various driving situations, particularly maneuvering situations and traffic jam situations.

This and other objects and advantages are achieved by the invention which includes a regulating and/or control unit for actuating a stop/start unit, particularly for an internal-combustion engine of a motor vehicle. At least one sensor is provided for detecting at least one parameter, as a function of which the unit actuates the stop/start unit during operation.

In one embodiment of the invention, the sensor detects a parameter which depends on a steering wheel position and/or a steering wheel movement of the motor vehicle. Based on this information, it is possible to detect a driving situation, such as a maneuvering situation, and to distinguish it from a traffic jam situation. If a maneuvering situation has been detected based on steering behavior, the related information can (for example, by way of a CAN bus of the motor vehicle) also be utilized by other control and regulating units of the motor vehicle. The person skilled in the art will recognize that the unit can be a component which is separate from the stop/start unit, or can at least partially be integrated into the latter, particularly in a control and/or regulating unit of the stop/start unit.

In a further embodiment of the invention, the regulating and/or control unit deactivates at least one function of the stop/start unit when the parameters, particularly a steering angle and/or a steering speed, in each case, exceed at least one threshold value. As a result, it is possible in a simple manner, to distinguish between a traffic jam, which is typically characterized by small steering angles and steering speeds and a maneuvering situation, with large steering angles and steering speeds. Expediently, two threshold values are provided respectively, which include an interval of steering wheel positions and/or steering speeds, and the unit deactivates an automatic stop function of the stop/start unit as soon as the amount of the steering angle and/or of the steering speed exceeds a threshold value.

In still another embodiment of the invention, the regulating and/or control unit has at least one sensor which detects a parameter for driving speed, as a function which the unit actuates the stop/start unit during the operation. As a result, it is possible to avoid mistaking a fast drive of the motor vehicle on a winding road for a maneuvering situation, which can be detected with still greater certainty.

According to another embodiment of the invention, a sensor is provided for the detection of a drive position parameter, as a function of which the unit actuates the stop/start unit during the operation. The stop/start unit can advantageously be deactivated as soon as the transmission is shifted into a reversing position which occurs almost exclusively in maneuvering situations.

The system may also be equipped with a time measuring device, and the regulating and/or control unit activates the stop/start unit as a function of at least one detected time during the operation. A deactivated stop function of the stop/start unit can advantageously be activated after a preadjusted time period, which can be determined from experimental values for the time required for a maneuvering operation.

In one embodiment of the invention, at least one threshold value is automatically and/or manually adjustable, so that the device can be adapted to driving situations determined from additional parameters or to individual driving habits of a vehicle driver.

According to a further feature of the invention, the regulating and/or control unit is constructed to actuate a hybrid machine. In a detected maneuvering situation, an operating mode of the engine designed for driving situations can advantageously be replaced by a particularly economical operating mode of the engine designed for maneuvering situations.

Other objects, advantages and novel features of the present invention will become apparent from the following detailed description of the invention when considered in conjunction with the accompanying drawings.

DETAILED DESCRIPTION OF THE DRAWINGS

Figure 1:
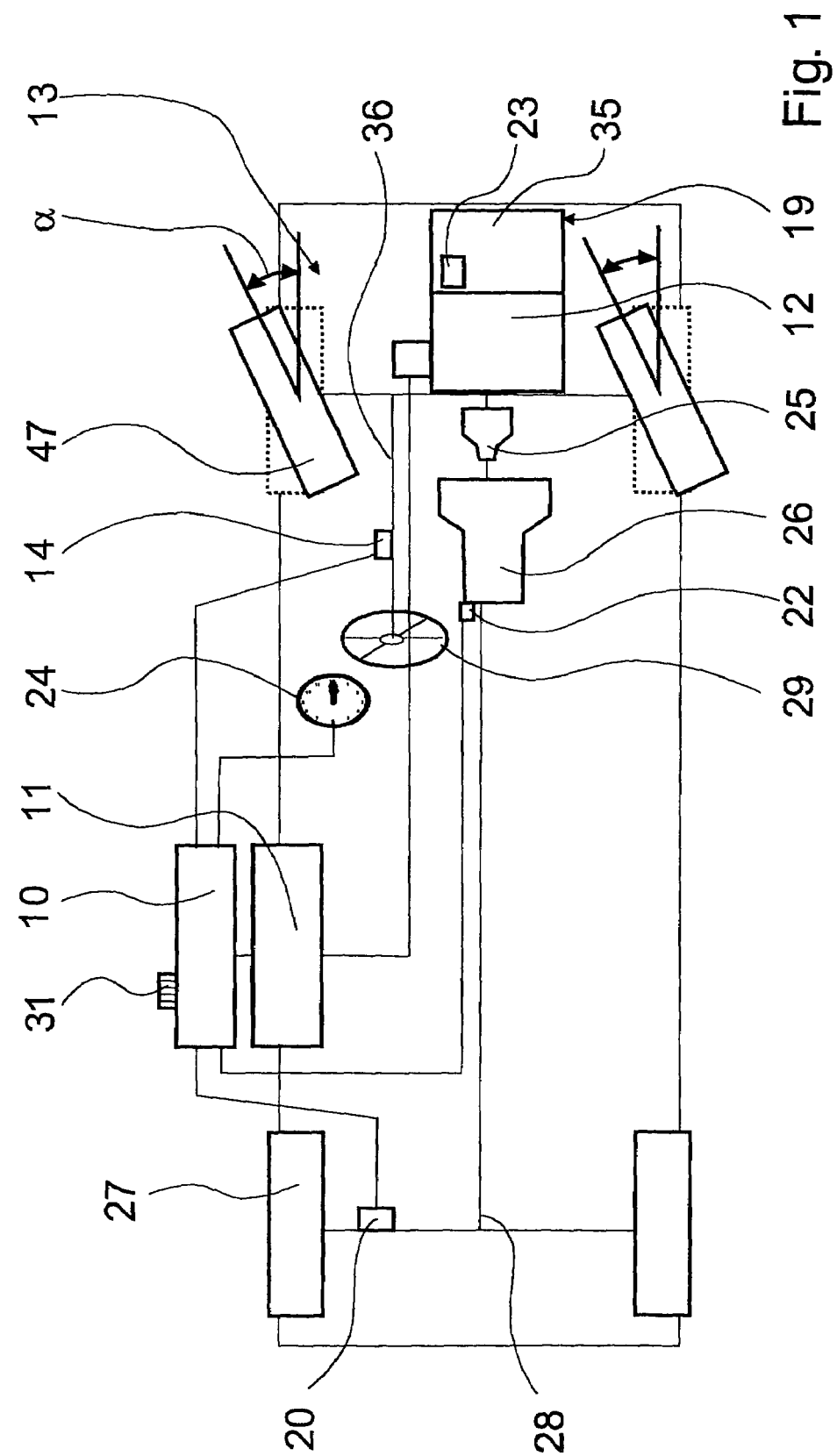
FIG. 1 is a schematic representation of a motor vehicle having a unit for actuating a stop/start device.

In FIG. 1, a motor vehicle 13 has a system which includes a regulating/control unit 10 for actuating a stop/start unit 11. An internal-combustion engine 12 is connected via a clutch 25, with a transmission 26, which drives rear wheels 27 by means of a drive shaft 28. A driver can set a steering angle α of front wheels 47 by means of a steering wheel 29, which steering angle α is sensed by a first sensor 14 coupled with a steering rod 36. The regulating/control unit 10 requests the steering angle α from the first sensor 14, together with a driving speed parameter v from a second sensor 20, a parameter R representing a drive position of the transmission 26 from a third sensor 22, and a time from a time measuring device 24.

Figure 2:
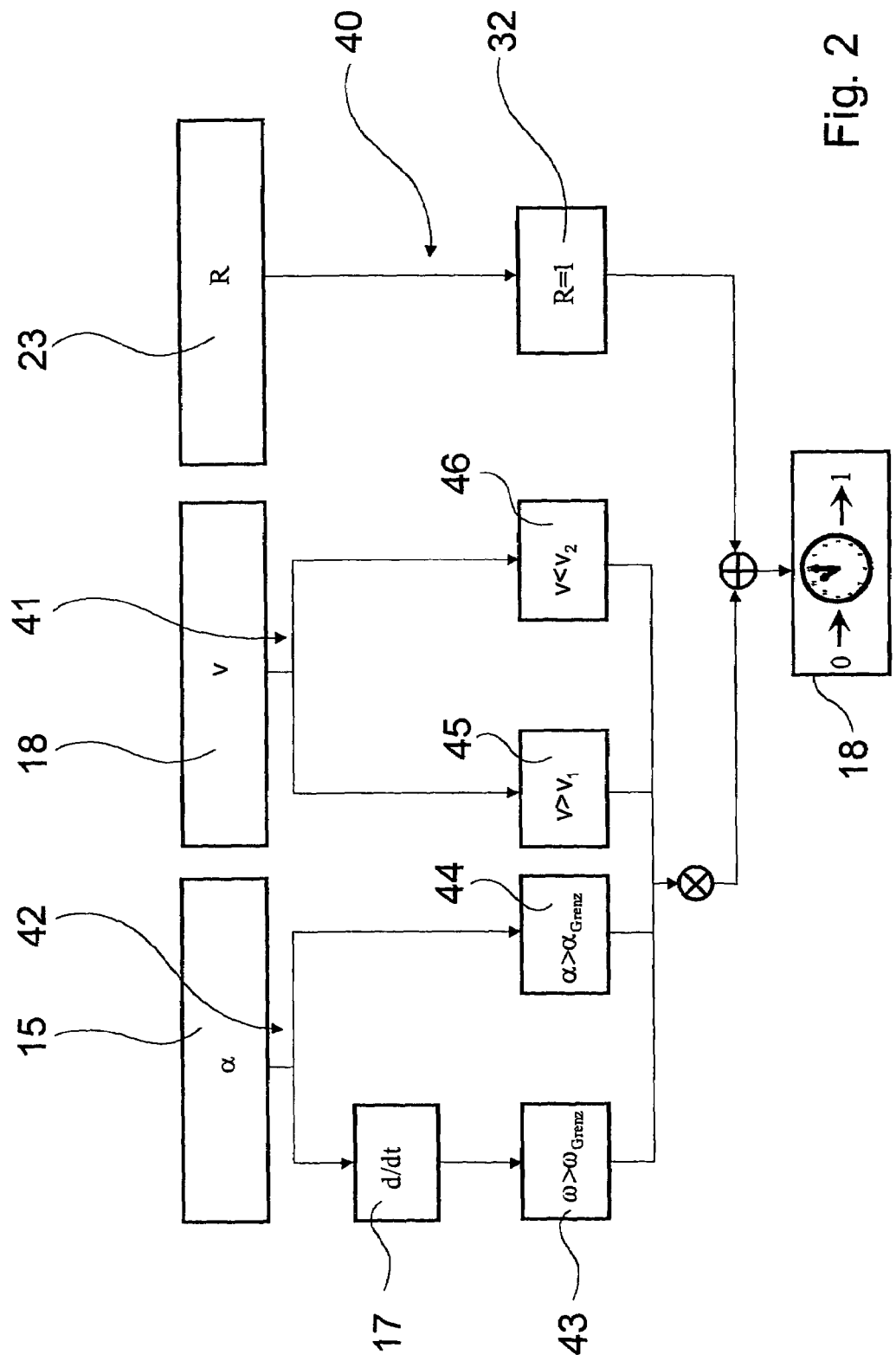
FIG. 2 is logic diagram of the unit for detecting a maneuvering operation of a motor vehicle.

FIG. 2 is a logic diagram according to which the unit 10 analyzes the requested parameters α, v and R. When the parameter R obtained by the unit 10 at the third sensor 22 assumes the value 1 (indicating a reversing position), condition 32 in the right-hand branch 40 of the diagram has been met and the unit starts a sequence 18, during which it first deactivates an automatic stop function of the stop/start unit 11 and reactivates it again after a time period 34 of approximately 10 to 20 seconds.

Figure 3:
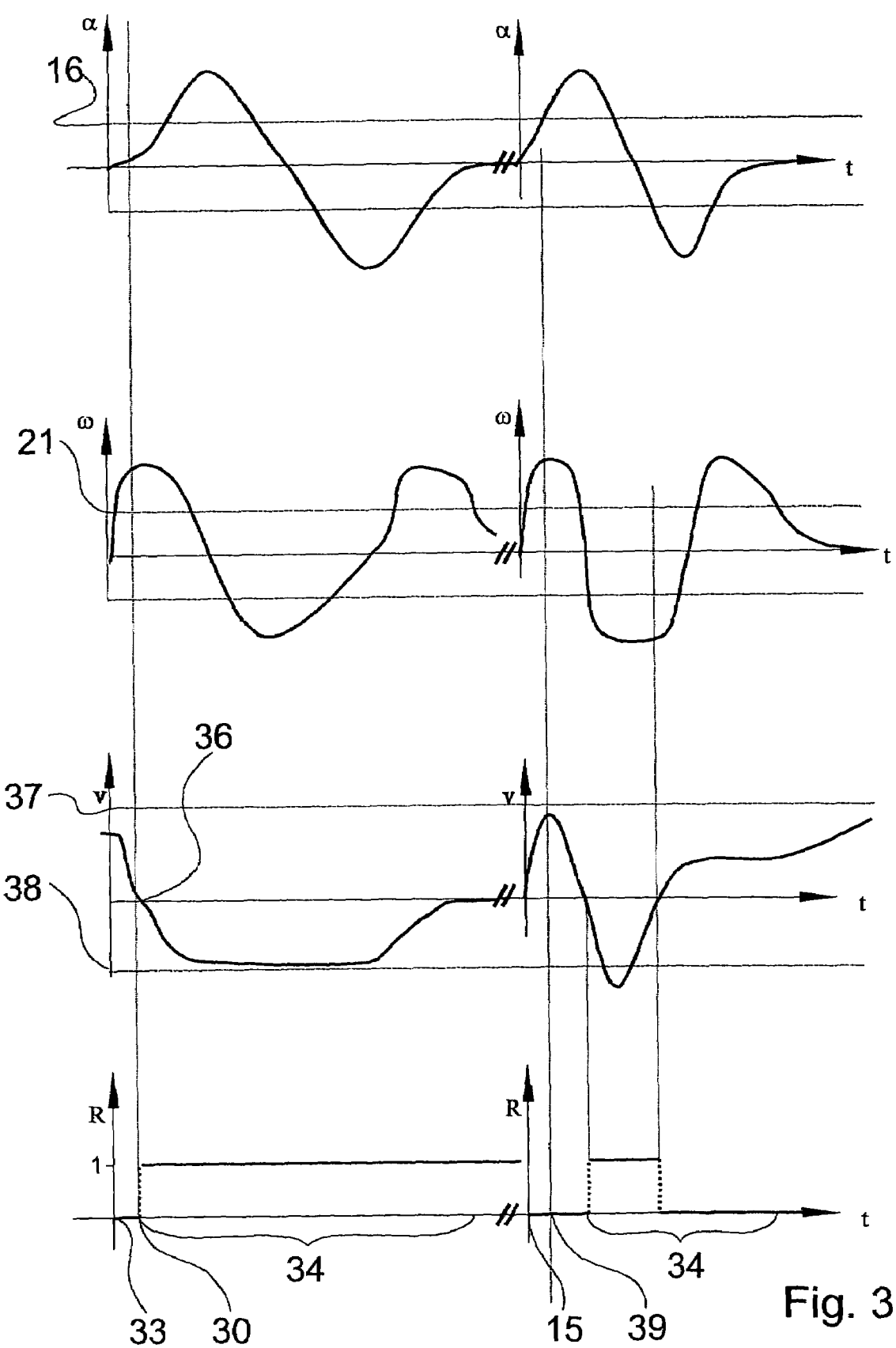
FIG. 3 is a graphic representation of the temporal course of four parameters during the operation of entering and leaving a parking space.

In a left-hand branch 42 and a center branch 41 of the logic diagram, a total of four conditions 43–46 have to be met so that the sequence 18 is started. The unit 10, which comprises a computer unit, determines the time derivative 17 of the parameter α, and thus a parameter ω forming a steering speed. When the value of this parameter α is greater than a threshold value 21, the first condition 43 has been met (FIGS. 2 and 3). When the amount of the parameter α is also greater than a threshold value 16, which can be manually adjusted by means of an adjusting device 31, the second condition 44 has also been met. The third condition 45 and the fourth condition 46 require that the driving speed parameter v is greater than a first threshold value 37 and smaller than a second threshold value 38. (An embodiment of the invention without threshold values 37, 38 for the parameter v would also be possible.) The sequence 18 (in which the automatic stop function is deactivated for a time period 34) starts after all four conditions 43–46 have been met. When the automatic stop function of the stop/start unit 11 is activated, the stop/start unit 11 also requests various parameters from sensors (not shown), and stops the running internal-combustion engine 12 when stop conditions have been met, which will not be discussed here in detail, and starts the internal-combustion engine 12 when corresponding start conditions have been met.

FIG. 3 shows an example of the sequence of the parameters α, ω, v and R during a maneuvering operation for a reversing parking in a parallel parking space, and during driving out of a parking space. At the beginning 33, the motor vehicle 13 is driving at a constant driving speed. A driver brakes the motor vehicle 13 until it comes to a stop. At a shifting point in time 30, the driver engages the reverse gear. At this moment, the parameter R assumes the value 1 and condition 32 has thus been met (FIG. 2), so that the automatic stop function of the stop/start unit 11 is deactivated. In addition, as discussed below, the conditions 43–46 are met at a later point in time, and the occurrence of a maneuvering situation, and the deactivation of the automatic stop function is confirmed.

A subsequent operation shows the motor vehicle driving out of a parking space. At a starting point in time 15, the driver carries out a fast steering movement in a first direction. At a switch-off point in time 39, conditions 43 and 44 have been met by the fast steering movement, and conditions 45 and 46 have been met by an existing low driving speed, and the regulating/control unit 10 deactivates the automatic stop function of the stop/start unit 11 for a time period 34. During this time period 34, the driver briefly, at a steering wheel angle, moves back into a second direction, stops and then drives out of the parking space in the forward direction. After the operation of driving out of the parking space, the time period 34 is terminated, and the automatic stop function of the stop/start unit 11 is activated again for a normal driving operation.

In addition to the internal-combustion engine 12, the motor vehicle 13 shown in FIG. 1 has an electric machine 35 for driving and current generating functions. The two machines 12, 35 together represent a hybrid machine 19. An electric machine control 23 controls the driving and current generating conditions of the electric machine 35. When the system has detected a maneuvering situation, the regulating/control unit 10 switches off the internal-combustion engine 12 by way of the stop/start device 11 and activates the electric machine 35.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control system for a motor vehicle having a combustion engine, comprising:
    a stop/start unit for said internal-combustion engine;
    a control unit for actuating said start/stop unit; and
    at least one first sensor for detecting at least one first parameter which is dependent on a steering wheel position of the motor vehicle; wherein
    the control unit actuates the stop/start unit during the operation of the vehicle, as a function of said at least one first parameter; and
    the control unit deactivates at least one function of the stop/start unit when the time derivative of the at least one first parameter exceeds at least a second threshold value.

2. The control system according to claim 1 wherein the control unit deactivates at least one function of the stop/start unit when the at least one first parameter exceeds at least one first threshold value.

3. The control system according to claim 1, further comprising:
    at least one sensor for detecting a second parameter indicative of driving speed;
    wherein the control unit actuates the stop/start unit, as a function of said second parameter.

4. The control system according to claim 3, further comprising:
    at least one third sensor for detecting a third parameter indicative of a drive position of a vehicle transmission; and
    the control unit actuates the stop/start unit, as a function of said third parameter.

5. A control system for a motor vehicle having a combustion engine, comprising:
    a stop/start unit for said internal-combustion engine;
    a control unit for actuating said start/stop unit; and
    at least one first sensor for detecting at least one first parameter which is dependent on a steering wheel position of the motor vehicle; wherein the control unit actuates the stop/start unit during the operation of the vehicle, as a function of said at least one first parameter;

the control unit deactivates at least one function of the stop/start unit when the at least one first parameter exceeds at least one first threshold value;

the control system further comprises a time measuring device; and the control unit actuates the stop/start unit as a function of at least one detected time during a vehicle operation.

6. A control system for a motor vehicle having a combustion engine, comprising:

a stop/start unit for said internal-combustion engine;

a control unit for actuating said start/stop unit; and at least one first sensor for detecting at least one first parameter which is dependent on a steering wheel position of the motor vehicle; wherein the control unit actuates the stop/start unit during the operation of the vehicle, as a function of said at least one first parameter;

the control unit deactivates at least one function of the stop/start unit when the at least one first parameter exceeds at least one first threshold value; and the at least one first threshold value is adjustable.

7. A control system for a motor vehicle having a combustion engine, comprising:

a stop/start unit for said internal-combustion engine;

a control unit for actuating said start/stop unit; and at least one first sensor for detecting at least one first parameter which is dependent on a steering wheel position of the motor vehicle; wherein the control unit actuates the stop/start unit during the operation of the vehicle, as a function of said at least one first parameter;

the control unit deactivates at least one function of the stop/start unit when the at least one first parameter exceeds at least one first threshold value; and the control unit actuates a hybrid machine.

8. A method of controlling operation of a combustion engine in a motor vehicle having a start/stop unit for automatically starting and stopping operation of said combustion engine during operation of said motor vehicle, said method comprising:

detecting at least one first parameter that is indicative of steering wheel position of said motor vehicle; and deactivating and activating operation of the start/stop unit as a function of said at least one first parameter;

wherein said deactivating and activating comprises deactivating at least one function of the start/stop unit when the time derivative of the at least one first parameter exceeds at least a second threshold value.

9. The method according to claim 8, wherein said deactivating and activating comprises deactivating at least one function of the start/stop unit when the at least one first parameter exceeds at least one first threshold value.

10. The method according to claim 8, further comprising:

detecting at least one second parameter that is indicative of driving speed of said vehicle; and deactivating and activating the start/stop unit as a function of second parameter.

11. The method according to claim 10, further comprising:

detecting at least one third parameter indicative of a drive position of a vehicle transmission; and deactivating and activating the start/stop unit as a function of said third parameter.

12. A method of controlling operation of a combustion engine in a motor vehicle having a start/stop unit for automatically starting and stopping operation of said combustion engine during operation of said motor vehicle, said method comprising:

detecting at least one first parameter that is indicative of steering wheel position of said motor vehicle; and deactivating and activating operation of the start/stop unit as a function of said at least one first parameter;

wherein said method further comprises measuring time during operation of the vehicle, and deactivating and activating the start/stop unit as a function of time.

* * * * *